United States Patent
Yang et al.

(10) Patent No.: US 10,307,731 B2
(45) Date of Patent: *Jun. 4, 2019

(54) ATTRITION-RESISTANT SUPERABSORBENT POLYMER AND METHOD FOR PRODUCING SAME

(71) Applicant: LG Chem, Ltd., Seoul (KR)

(72) Inventors: Young-In Yang, Daejeon (KR); Young-Sam Kim, Daejeon (KR); Kyoung-Shil Oh, Daejeon (KR); Bo-Hee Park, Daejeon (KR); Su-Jin Kim, Daejeon (KR)

(73) Assignee: LG Chem, Ltd. (KR)

(*) Notice: Subject to any disclaimer, the term of this patent is extended or adjusted under 35 U.S.C. 154(b) by 275 days.

This patent is subject to a terminal disclaimer.

(21) Appl. No.: 15/307,232

(22) PCT Filed: Oct. 14, 2015

(86) PCT No.: PCT/KR2015/010865
§ 371 (c)(1),
(2) Date: Oct. 27, 2016

(87) PCT Pub. No.: WO2016/104926
PCT Pub. Date: Jun. 30, 2016

(65) Prior Publication Data
US 2017/0050171 A1    Feb. 23, 2017

(30) Foreign Application Priority Data
Dec. 23, 2014 (KR) .................... 10-2014-0186684

(51) Int. Cl.
*B01J 20/26* (2006.01)
*B01J 20/28* (2006.01)
(Continued)

(52) U.S. Cl.
CPC ....... *B01J 20/267* (2013.01); *B01J 20/28047* (2013.01); *B01J 20/28061* (2013.01);
(Continued)

(58) Field of Classification Search
None
See application file for complete search history.

(56) References Cited

U.S. PATENT DOCUMENTS

| 5,087,656 | A | 2/1992 | Yoshinaga et al. |
| 5,492,759 | A | 2/1996 | Eriksson et al. |

(Continued)

FOREIGN PATENT DOCUMENTS

| CN | 1617901 A | 5/2005 |
| CN | 101605819 A | 12/2009 |

(Continued)

OTHER PUBLICATIONS

International Search Report from PCT/KR2015/010865, dated Jan. 28, 2016.
(Continued)

*Primary Examiner* — Katie L. Hammer
(74) *Attorney, Agent, or Firm* — Lerner, David, Littenberg, Krumholz & Mentlik, LLP

(57) ABSTRACT

Disclosed is an attrition-resistant superabsorbent polymer, including a superabsorbent polymer, porous superhydrophobic microparticles, and water, thus increasing moisture content of the superabsorbent polymer and a method of manufacturing the attrition-resistant superabsorbent polymer is also provided.

37 Claims, 6 Drawing Sheets

(51) Int. Cl.

| | | |
|---|---|---|
| *B01J 20/30* | (2006.01) | |
| *C08J 3/075* | (2006.01) | |
| *C08J 3/24* | (2006.01) | |
| *C08K 3/36* | (2006.01) | |
| *C08K 7/26* | (2006.01) | |
| *C08F 2/10* | (2006.01) | |
| *C08K 7/22* | (2006.01) | |
| *C08L 101/14* | (2006.01) | |

(52) U.S. Cl.
CPC ... *B01J 20/28064* (2013.01); *B01J 20/28066* (2013.01); *B01J 20/3021* (2013.01); *B01J 20/3085* (2013.01); *C08F 2/10* (2013.01); *C08J 3/075* (2013.01); *C08J 3/245* (2013.01); *C08K 3/36* (2013.01); *C08K 7/22* (2013.01); *C08K 7/26* (2013.01); *C08L 101/14* (2013.01); *C08J 2333/02* (2013.01); *C08J 2333/08* (2013.01); *C08J 2333/10* (2013.01); *C08J 2333/14* (2013.01); *C08K 2201/006* (2013.01)

(56) References Cited

U.S. PATENT DOCUMENTS

| | | | |
|---|---|---|---|
| 5,731,365 A | | 3/1998 | Engelhardt et al. |
| 5,840,321 A | | 11/1998 | Engelhardt et al. |
| 5,980,879 A | | 11/1999 | Hiroki et al. |
| 6,414,214 B1 | | 7/2002 | Engelhardt et al. |
| 7,087,669 B2 * | | 8/2006 | Ota ................ A61F 13/53 |
| | | | 428/500 |
| 7,612,016 B2 | | 11/2009 | Mertens et al. |
| 2004/0044321 A1 | | 3/2004 | Kainth et al. |
| 2005/0181200 A1 | | 8/2005 | Mertens et al. |
| 2008/0261807 A1 * | | 10/2008 | Chevigny ........... A61L 15/18 |
| | | | 502/402 |
| 2008/0262155 A1 | | 10/2008 | Mertens et al. |
| 2010/0035059 A1 | | 2/2010 | Losch et al. |
| 2015/0259522 A1 | | 9/2015 | Lee et al. |

FOREIGN PATENT DOCUMENTS

| | | |
|---|---|---|
| CN | 103044752 A | 4/2013 |
| CN | 104144973 A | 11/2014 |
| EP | 0703265 A1 | 3/1996 |
| EP | 0755964 A2 | 1/1997 |
| EP | 0797966 A1 | 10/1997 |
| EP | 3078678 A1 | 10/2016 |
| EP | 3078679 A1 | 10/2016 |
| JP | S644653 A | 1/1989 |
| JP | H08176338 A | 7/1996 |
| JP | H08253597 A | 10/1996 |
| JP | 2000109714 A | 4/2000 |
| JP | 2005511304 A | 4/2005 |
| JP | 2009057496 A | 3/2009 |
| JP | 2010253283 A | 11/2010 |
| JP | 2011178969 A | 9/2011 |
| JP | 2012052080 A | 3/2012 |
| JP | 2012217599 A | 11/2012 |
| KR | 20120081113 A | 7/2012 |
| KR | 20140126821 A | 11/2014 |
| WO | 2005120594 A1 | 12/2005 |
| WO | 2014185644 A1 | 11/2014 |

OTHER PUBLICATIONS

Extended European Search Report for Application No. 15873454.1, dated Apr. 26, 2017.

* cited by examiner

ATTRITION-RESISTANT SUPERABSORBENT POLYMER AND METHOD FOR PRODUCING SAME

CROSS REFERENCE TO RELATED APPLICATION

This application is a national phase entry under 35 U.S.C. § 371 of International Application No. PCT/KR2015/010865, filed Oct. 14, 2015, which claims priority to Korean Patent Application No. 10-2014-0186684, filed Dec. 23, 2014, the disclosures of which are incorporated herein by reference.

BACKGROUND OF THE INVENTION

1. Technical Field

The present invention relates to an attrition-resistant superabsorbent polymer and a method of manufacturing the same and, more particularly, to an attrition-resistant superabsorbent polymer, which includes a superabsorbent polymer, porous superhydrophobic microparticles, and water, thereby increasing the moisture content of the superabsorbent polymer.

2. Description of the Related Art

Superabsorbent polymers (SAPs) are synthetic polymers able to absorb water about 500~1000 times their own weight. Such superabsorbent polymers have actually begun to be used for sanitary items, and are being currently widely utilized in not only hygiene products such as baby paper diapers and menstrual sanitary pads, but also gardening soil repair agents, water stop agents for civil construction, seeding sheets, freshness retaining agents in food distribution sectors, and fomentation materials. Compared to conventional absorbent materials, superabsorbent polymers have outstanding absorption capacity and thus the market value thereof becomes high because of a wider range of applications thereof. In particular, superabsorbent polymers having excellent water absorbability are mainly employed in hygiene products such as baby diapers and adult diapers. Upon application to hygiene products, the superabsorbent polymer present in the diapers plays a role in absorbing and retaining urine. Meanwhile, in the course of manufacturing diapers, superabsorbent polymers may undergo high pressure and physical impact, and thus the properties thereof may be remarkably deteriorated, resulting in poor diaper performance.

In this regard, Korean Patent Application Publication No. 2012-0081113 discloses a method of manufacturing an absorbent polymer including water-insoluble inorganic particles. However, such a conventional technique is problematic because surface stickiness of the superabsorbent polymer becomes high with an increase in moisture content on the surface thereof, undesirably incurring agglomeration, poor processability, and low productivity as mentioned above, thus making it difficult to satisfy both high moisture content and high processability.

Thus, in order to manufacture final products such as diapers using superabsorbent polymers that may uniformly contain water without caking upon addition of water thereto and may possess improved attrition resistance, there is required to develop techniques able to obtain desired product performance while minimizing the deterioration of the properties of the superabsorbent polymer due to physical attrition by compression or strong air movement during production of the diapers.

SUMMARY OF THE INVENTION

Accordingly, the present invention has been made keeping in mind the problems encountered in the art, and an object of the present invention is to provide an attrition-resistant superabsorbent polymer and a method of manufacturing the same, wherein a superabsorbent polymer is not increased in surface stickiness even when water is added thereto, thus maintaining a particle size thereof and preventing processability from decreasing, ultimately easily controlling the process load, particle size, and properties in the manufacturing process. Therefore, the superabsorbent polymer may uniformly contain water without caking upon addition of water thereto and may possess improved attrition resistance, thus minimizing deterioration of the properties due to damage to the polymer in application processes, consequently obtaining desired product performance.

In order to accomplish the above object, the present invention provides an attrition-resistant superabsorbent polymer, comprising: a superabsorbent polymer (A), particles (B) having i) a BET specific surface area of 300~1500 $m^2/g$ and ii) a porosity of 50% or more, and water (C), wherein the particles (B) are contained in an amount of 0.0001~15 parts by weight based on 100 parts by weight of the superabsorbent polymer (A), and the water (C) is contained in an amount of 0.1~20.0 parts by weight based on 100 parts by weight of the superabsorbent polymer (A) and the particles (B).

In addition, the present invention provides a method of manufacturing an attrition-resistant superabsorbent polymer, comprising: a) adding a superabsorbent polymer (A) with 0.0001~15 parts by weight of particles (B) having i) a BET specific surface area of 300~1500 $m^2/g$ and ii) a porosity of 50% or more, based on 100 parts by weight of the superabsorbent polymer (A); and b) adding the superabsorbent polymer (A) and the particles (B) obtained in a) with 0.1~20.0 parts by weight of water (C), based on 100 parts by weight of the superabsorbent polymer (A) and the particles (B), thus preparing a hydrous superabsorbent polymer.

According to the present invention, an attrition-resistant superabsorbent polymer and a method of manufacturing the same can be provided. Even when a superabsorbent polymer is added with water, its surface stickiness is not increased, thus maintaining the particle size thereof to thereby prevent processability from decreasing, ultimately easily controlling the process load, particle size, and properties in the manufacturing process. Hence, the superabsorbent polymer can uniformly contain water without caking upon addition of water thereto. Further, as the superabsorbent polymer is added with water by means of porous superhydrophobic microparticles, attrition resistance thereof is enhanced. Therefore, when the superabsorbent polymer is applied to final products such as diapers, deterioration of the properties thereof due to physical attrition by compression or strong air movement during production of the diapers can be minimized, resulting in desired product performance.

DESCRIPTION OF THE SPECIFIC EMBODIMENTS

Figure 1:
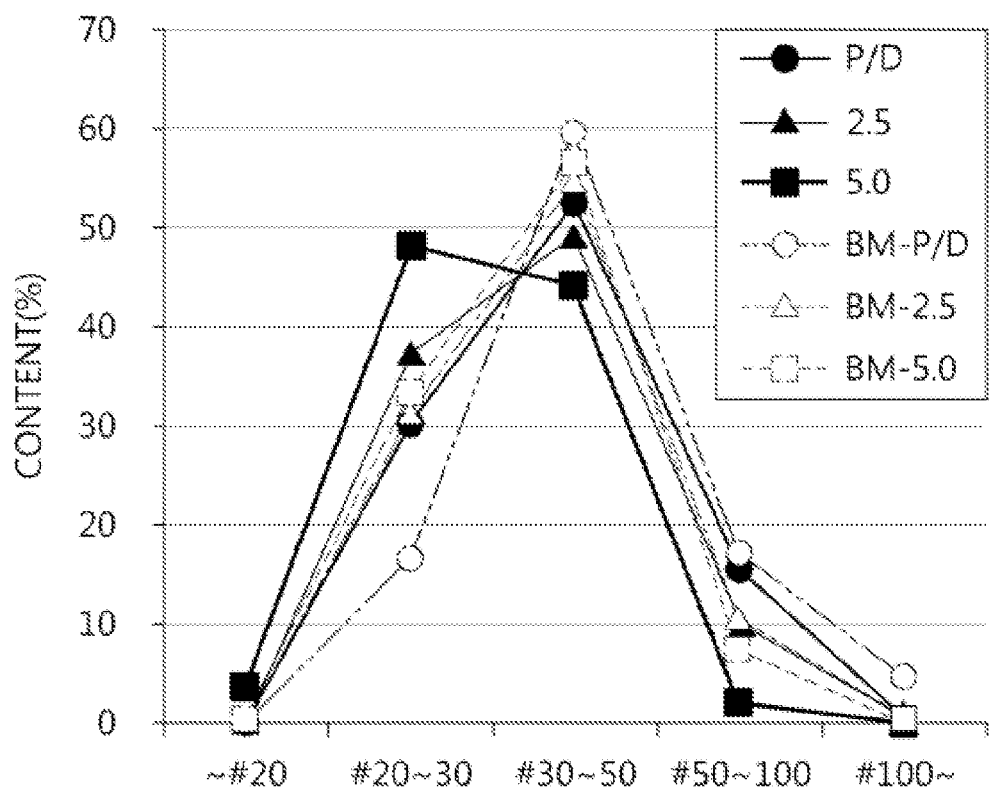
FIG. 1 is a graph illustrating changes in the particle size of an attrition-resistant superabsorbent polymer according to the present invention before/after ball milling depending on an increase in the amount of added water.

Hereinafter, a detailed description will be given of the present invention.

According to the present invention, an attrition-resistant superabsorbent polymer comprises a superabsorbent polymer (A), particles (B) having i) a BET specific surface area of 300~1500 $m^2/g$ and ii) a porosity of 50% or more, and water (C), wherein the particles (B) are contained in an amount of 0.0001~15 parts by weight based on 100 parts by weight of the superabsorbent polymer (A), and the water (C) is contained in an amount of 0.1~20.0 parts by weight based on 100 parts by weight of the superabsorbent polymer (A) and the particles (B).

In the attrition-resistant superabsorbent polymer, the particles (B) having the properties of i) and ii) are contained in an amount of 0.0001~15 parts by weight, preferably 0.001~2.0 parts by weight, and more preferably 0.05~0.15 parts by weight, based on 100 parts by weight of the superabsorbent polymer (A). If the amount of the particles (B) is less than the lower limit, desired effects may not be sufficiently obtained. In contrast, if the amount thereof exceeds the upper limit, economic benefits may be negated due to excessive use of the particles (B).

Typically, a superabsorbent polymer has a hydrophilic surface, and may thus undergo irreversible agglomeration due to capillary force, hydrogen bonding, inter-particular diffusion, or inter-particular van der Waals force, by water present between the particles upon drying after water absorption. Hence, water is essentially used in the course of polymerization and surface crosslinking of the superabsorbent polymer, but agglomeration may be caused thereby, thus increasing internal loads, ultimately incurring damage to the system. Furthermore, since the agglomerated superabsorbent polymer has a large particle size unsuitable for use in applications, a disintegration process has to be implemented so that such a large particle size is decreased appropriately. Also, strong force is applied in the disintegration process, undesirably deteriorating the properties of the superabsorbent polymer attributed to attrition.

In order to solve such problems, attempts are made to introduce a variety of microparticles that are present on the surface of the superabsorbent polymer and function to prevent direction agglomeration of the polymer particles. In the case where the microparticles are added in an excessive amount, agglomeration may be prevented, but absorption under pressure of the superabsorbent polymer may become low.

To solve such problems, the microparticles introduced to the superabsorbent polymer according to the present invention have a particle size ranging from 2 nm to 50 µm. Also, the microparticles have a BET specific surface area of 300~1500 $m^2/g$, preferably 500~1500 $m^2/g$, and more preferably 600~1500 $m^2/g$. Also, the microparticles have superhydrophobicity with a water contact angle of 125° or more, preferably 135° or more, and more preferably 140° or more. Furthermore, the particles (B) may have a particle size ranging from 2 nm to 50 µm and superhydrophobicity with a water contact angle of 125° or more.

The microparticles have a porosity of 50% or more, and preferably 90% or more. Since the attrition-resistant superabsorbent polymer according to the present invention includes the microparticles (B) having the properties as above, the effect of water present on the surface of the polymer may decrease, and also the use of porous superhydrophobic microparticles may remarkably reduce agglomeration. Even when a relatively small amount of microparticles is used, permeability may be easily increased, and absorption under pressure may be readily maintained.

In the method of manufacturing the superabsorbent polymer according to the present invention, the particles (B) may include any component without limitation so long as it has the above properties, and specific examples thereof may include, but are not limited to, inorganic oxides, such as silica ($SiO_2$), alumina, titania ($TiO_2$), carbon, inorganic compounds, organic polymers, ion exchange resins, metals, metal salts, etc.

Also, adding the microparticles may include, but is not limited to, dispersing microparticles in a monomer solution, adding microparticles to a hydrous gel polymer and then dry mixing them with primarily dried polymer particles, dispersing microparticles in water or an organic solvent having a dissolved surface crosslinking agent upon surface crosslinking, dry mixing microparticles separately from water or an organic solvent having a dissolved surface crosslinking agent upon surface crosslinking, or dry mixing microparticles with a surface crosslinked product.

In the attrition-resistant superabsorbent polymer, the water (C) is contained in an amount of 0.1~20.0 parts by weight, preferably 1.0~10.0 parts by weight, and more preferably 2.5~7.5 parts by weight, based on 100 parts by weight of the superabsorbent polymer (A) and the particles (B). If the amount of the water (C) is less than the lower limit, attrition resistance is not sufficiently obtained. In contrast, if the amount thereof exceeds the upper limit, surface stickiness of the polymer may increase, and irreversible agglomeration between superabsorbent polymer particles may occur, undesirably deteriorating processability of the polymer and changing the particle size thereof, making it difficult to serve as a final product.

In the process of manufacturing the superabsorbent polymer, water that is a polymerization medium is variously used in a manner that facilitates the dispersion of the crosslinking solution during the surface crosslinking. Also, residual moisture of the final product functions as an anti-static agent and a plasticizer for resin, and plays a role in suppressing the formation of very small superabsorbent polymer dust in the course of applications and also preventing the attrition of the superabsorbent polymer particles. Generally, however, when water is added even in a small amount to the superabsorbent polymer, surface stickiness of the polymer may be increased by the water absorbed to the surface thereof, and irreversible agglomeration between the superabsorbent polymer particles may take place. The increase in stickiness and the agglomeration as mentioned above may result in poor processability, including high loads on the manufacturing and application processes, consequently increasing the particle size of the superabsorbent polymer and deteriorating the properties and the productivity. Superabsorbent polymers have been studied to date in terms of the polymerization process thereof and enhancements in absorption capacity thereby, and surface crosslinking for increasing the surface properties of the superabsorbent polymer or the absorption under pressure thereof. Furthermore, research is ongoing into changes in the surface properties of the superabsorbent polymer to increase permeability or to prevent caking upon storage (anti-caking).

Also in the present invention, water is added in the above amount range to the superabsorbent polymer to thereby increase moisture content, so that water functions as a plasticizer, ultimately minimizing physical damage to the superabsorbent polymer to satisfy both high moisture content and high processability. When water is added to the superabsorbent polymer, it may be uniformly contained therein without caking. When the superabsorbent polymer is applied to final products such as diapers, deterioration of the properties thereof due to physical attrition by compression or strong air movement during production of the diapers may be minimized.

In the attrition-resistant superabsorbent polymer, the superabsorbent polymer (A) is obtained by a) preparing a hydrous gel polymer from a monomer composition comprising a water-soluble ethylenic unsaturated monomer and a polymerization initiator by thermal polymerization or photopolymerization; b) drying the hydrous gel polymer; c) grinding the dried hydrous gel polymer, giving superabsorbent polymer particles; and d) adding the superabsorbent polymer particles with a surface crosslinking agent so that a surface crosslinking reaction is carried out.

As used herein, the term "superabsorbent polymer particles" refers to particles obtained by drying and grinding the hydrous gel polymer. More specifically, the hydrous gel polymer is a material in a hard jelly phase with a size of 1 cm or more having water in a large amount (50% or more) after completion of the polymerization. The hydrous gel polymer is dried and ground in a powder phase, yielding superabsorbent polymer particles. Thus, the hydrous gel polymer corresponds to a process intermediate.

In the superabsorbent polymer (A) according to the present invention, a) preparing the hydrous gel polymer from the monomer composition comprising the water-soluble ethylenic unsaturated monomer and the polymerization initiator by thermal polymerization or photopolymerization is performed.

To manufacture the superabsorbent polymer, a polymer may be prepared by steps and methods typically used in the art. Specifically, upon manufacturing the superabsorbent polymer according to the present invention, the monomer composition includes a polymerization initiator. Depending on the polymerization method, when photopolymerization is performed, a photopolymerization initiator is used, and when thermal polymerization is performed, a thermal polymerization initiator is employed. Even when the photopolymerization is conducted, a predetermined amount of heat is generated due to irradiation with UV light and also through the polymerization that is an exothermic reaction, and thus a thermal polymerization initiator may be additionally included.

In the method of manufacturing the superabsorbent polymer according to the present invention, the thermal polymerization initiator is not particularly limited, but preferably includes at least one selected from the group consisting of a persulfate-based initiator, an azo-based initiator, hydrogen peroxide, and ascorbic acid. Specifically, examples of the persulfate-based initiator may include sodium persulfate ($Na_2S_2O_8$), potassium persulfate ($K_2S_2O_8$), and ammonium persulfate (($NH_4)_2S_2O_8$); and examples of the azo-based initiator may include 2,2-azobis(2-amidinopropane)dihydrochloride, 2,2-azobis-(N,N-dimethylene)isobutyramidine dihydrochloride, 2-(carbamoylazo)isobutyronitrile, 2,2-azobis[2-(2-imidazolin-2-yl)propane]dihydrochloride, and 4,4-azobis-(4-cyanovaleric acid).

In the method of manufacturing the superabsorbent polymer according to the present invention, the photopolymerization initiator is not particularly limited, but preferably includes at least one selected from the group consisting of benzoin ether, dialkyl acetophenone, hydroxyl alkylketone, phenyl glyoxylate, benzyl dimethyl ketal, acyl phosphine, and α-aminoketone. A specific example of the acyl phosphine may include commercially available lucirin TPO, namely, 2,4,6-trimethyl-benzoyl-trimethyl phosphine oxide.

In the method of manufacturing the superabsorbent polymer according to the present invention, the water-soluble ethylenic unsaturated monomer is not particularly limited so long as it is a monomer typically used to synthesize a superabsorbent polymer, and preferably includes any one or more selected from the group consisting of an anionic monomer and salts thereof, a nonionic hydrophilic monomer, and an amino group-containing unsaturated monomer and quaternary salts thereof. Preferably useful is any one or more selected from the group consisting of anionic monomers and salts thereof such as acrylic acid, methacrylic acid, maleic anhydride, fumaric acid, crotonic acid, itaconic acid, 2-acryloylethanesulfonic acid, 2-methacryloylethanesulfonic acid, 2-(meth)acryloylpropanesulfonic acid, and 2-(meth)acrylamide-2-methylpropane sulfonic acid; nonionic hydrophilic monomers such as (meth)acrylamide, N-substituted (meth)acrylate, 2-hydroxyethyl(meth) acrylate, 2-hydroxypropyl(meth)acrylate, methoxypolyethyleneglycol (meth)acrylate, and polyethyleneglycol (meth) acrylate; and amino group-containing unsaturated monomers and quaternary salts thereof such as (N,N)-dimethylaminoethyl (meth)acrylate, and (N,N)-dimethylaminopropyl (meth)acrylamide. More preferably, acrylic acid or salts thereof are used. When acrylic acid or salts thereof are used as the monomer, a superabsorbent polymer having improved absorbability may be obtained advantageously.

In the method of manufacturing the superabsorbent polymer according to the present invention, the monomer composition may include a predetermined amount of a polymer or resin powder having a small particle size of less than 150 μm in the manufactured superabsorbent polymer powder to exhibit resource recycling effects. Specifically, the polymer or resin powder having a particle size of less than 150 μm may be added before initiation of the polymerization of the monomer composition, or in the early, middle or late step after initiation of the polymerization. As such, the added amount thereof is not limited, but is preferably set to 1~10 parts by weight based on 100 parts by weight of the monomer contained in the monomer composition, in order to prevent the properties of the final superabsorbent polymer from deteriorating.

In the method of manufacturing the superabsorbent polymer according to the present invention, the concentration of the water-soluble ethylenic unsaturated monomer of the monomer composition may be appropriately determined in consideration of the polymerization time and the reaction conditions, and is preferably set to 40~55 wt %. If the concentration of the water-soluble ethylenic unsaturated monomer is less than 40 wt %, economic benefits are negated. In contrast, if the concentration thereof exceeds 55 wt %, grinding efficiency of the hydrous gel polymer may decrease.

Preparing the hydrous gel polymer from the monomer composition by thermal polymerization or photopolymerization is not limited so long as it is typically useful. Specifically, the polymerization method is largely classified into thermal polymerization and photopolymerization depending on the polymerization energy source. Typically, thermal polymerization is conducted using a reactor with a stirring shaft, such as a kneader, and photopolymerization is implemented using a reactor with a movable conveyor belt. However, the above polymerization method is merely illustrative, and the present invention is not limited to such a polymerization method.

For example, hot air is fed to a reactor with a stirring shaft, such as a kneader, or the reactor is heated, so that thermal polymerization is carried out, resulting in a hydrous gel polymer, which is then discharged to a size ranging from ones of mm to ones of cm through the outlet of the reactor depending on the shape of the stirring shaft of the reactor. Specifically, the size of the hydrous gel polymer may vary depending on the concentration of the supplied monomer composition and the supply rate thereof, and typically a hydrous gel polymer having a particle size of 2~50 mm may be obtained.

Also, when photopolymerization is carried out using a reactor with a movable conveyor belt, a hydrous gel polymer in a sheet form with a belt width may result. As such, the thickness of the polymer sheet may vary depending on the concentration of the supplied monomer composition and the supply rate thereof, but the monomer composition is preferably supplied so as to obtain a polymer sheet having a thickness of 0.5~5 cm. In the case where the monomer composition is supplied to the extent that a very thin polymer sheet is formed, production efficiency may decrease. If the thickness of the polymer sheet is greater than 5 cm, polymerization may not be uniformly carried out throughout the sheet that is too thick.

The light source usable for photopolymerization is not particularly limited, and any UV light source may be used without limitation so long as it is known to cause a photopolymerization reaction. For example, light having a wavelength of about 200~400 nm may be used, and a UV light source such as a Xe lamp, an Hg lamp, or a metal halide lamp may be adopted. Furthermore, photopolymerization may be conducted at an intensity ranging from about 0.1 mw/cm$^2$ to about 1 kw/cm$^2$ for a period of time ranging from about 5 sec to about 10 min. If the intensity of light applied to the photopolymerization reaction and the time thereof are excessively small and short, polymerization may not sufficiently occur. In contrast, if they are excessively large and long, the quality of the superabsorbent polymer may deteriorate.

Next, b) drying the hydrous gel polymer is performed.

The hydrous gel polymer obtained in a) typically has a moisture content of 30~60 wt %. As used herein, the term "moisture content" refers to an amount of moisture based on the total weight of the hydrous gel polymer, namely, a value obtained by subtracting the weight of the dried polymer from the weight of the hydrous gel polymer (Specifically, it is defined as a value calculated by measuring a weight reduction due to moisture evaporation from the polymer during drying the polymer at high temperature via IR heating. As such, the drying is performed in such a manner that the temperature is increased from room temperature to 180° C. and then maintained at 180° C., and the total drying time is set to 20 min including 5 min necessary for increasing the temperature).

The hydrous gel polymer obtained in a) is dried, and preferably the drying temperature is set to 150~250° C. As used herein, the term "drying temperature" refers to a temperature of a heat medium supplied for the drying process or a temperature of a drying reactor including a heat medium and a polymer in the drying process.

If the drying temperature is lower than 150° C., the drying time may become excessively long, and the properties of the final superabsorbent polymer may thus deteriorate. In contrast, if the drying temperature is higher than 250° C., only the surface of the polymer may be excessively dried, and thereby fine powder may be generated in the subsequent grinding process, and the properties of the final superabsorbent polymer may deteriorate. The drying is preferably performed at a temperature of 150~250° C., and more preferably 160~200° C.

The drying time is not limited, but may be set to 20~90 min taking into account the process efficiency.

Also, the drying process is not limited so long as it is used to dry the hydrous gel polymer. Specific examples thereof may include hot air supply, IR irradiation, microwave irradiation, and UV irradiation. The polymer after the drying process may have a moisture content of 0.1~10 wt %.

Meanwhile, the method of manufacturing the superabsorbent polymer according to the present invention may further comprise a simple grinding process before the drying process, as necessary, in order to increase the drying efficiency. The simple grinding process before the drying process is conducted so that the particle size of the hydrous gel polymer is 1~15 mm. Grinding the particle size of the polymer to less than 1 mm is technically difficult due to high moisture content of the hydrous gel polymer, and the ground particles may agglomerate. On the other hand, if the polymer is ground to a particle size of greater than 15 mm, an effect of increasing the drying efficiency via the grinding process may become insignificant.

In the simple grinding process before the drying process, any grinder may be used without limitation. A specific example thereof may include, but is not limited to, any one selected from the group consisting of a vertical pulverizer, a turbo cutter, a turbo grinder, a rotary cutter mill, a cutter mill, a disc mill, a shred crusher, a crusher, a chopper, and a disc cutter.

When the grinding process is performed to increase the drying efficiency before the drying process in this way, the polymer having high moisture content may stick to the surface of the grinder. Thus, in order to increase the grinding efficiency of the hydrous gel polymer before the drying process, an additive able to prevent stickiness upon grinding may be further used. Specifically, the kind of usable additive is not limited. Examples thereof may include, but are not limited to, a powder agglomeration inhibitor, such as steam, water, a surfactant, and inorganic powder such as clay or silica; a thermal polymerization initiator, such as a persulfate-based initiator, an azo-based initiator, hydrogen peroxide, and ascorbic acid; and a crosslinking agent, such as an epoxy-based crosslinking agent, a diol-based crosslinking agent, a bifunctional or trifunctional or higher polyfunctional acrylate, and a monofunctional compound having a hydroxyl group.

In the method of manufacturing the superabsorbent polymer according to the present invention, c) grinding the dried hydrous gel polymer is performed to obtain superabsorbent polymer particles, after the drying process. The superabsorbent polymer particles resulting from the grinding process have a particle size of 150~850 μm. In the method of manufacturing the superabsorbent polymer according to the present invention, a grinder used to obtain such a particle size may include, but is not limited to, a pin mill, a hammer mill, a screw mill, a roll mill, a disc mill, or a jog mill.

In d), the superabsorbent polymer particles are added with a surface crosslinking agent so that surface crosslinking is carried out. As such, the same or different surface crosslinking agent may be added depending on the particle size of the superabsorbent polymer particles.

In the method of manufacturing the superabsorbent polymer according to the present invention, the surface crosslinking agent is not limited so long as it is able to react with the functional group of the polymer. In order to improve the properties of the superabsorbent polymer, the surface crosslinking agent may include at least one selected from the group consisting of a polyhydric alcohol compound; an epoxy compound; a polyamine compound; a haloepoxy compound; a haloepoxy compound condensed product; an oxazoline compound; a mono-, di- or poly-oxazolidinone compound; a cyclic urea compound; a polyhydric metal salt; and an alkylene carbonate compound.

Specifically, the polyhydric alcohol compound may include at least one selected from the group consisting of mono-, di-, tri-, tetra- or poly-ethylene glycol, monopropylene glycol, 1,3-propanediol, dipropylene glycol, 2,3,4-trimethyl-1,3-pentanediol, polypropylene glycol, glycerol, polyglycerol, 2-butene-1,4-diol, 1,4-butanediol, 1,3-butanediol, 1,5-pentanediol, 1,6-hexanediol, and 1,2-cyclohexanedimethanol.

Examples of the epoxy compound may include ethylene glycol diglycidyl ether and glycidol, and the polyamine compound may include at least one selected from the group consisting of ethylene diamine, diethylene triamine, triethylene tetramine, tetraethylene pentamine, pentaethylene hexamine, polyethyleneimine, and polyamide polyamine.

Examples of the haloepoxy compound may include epichlorohydrine, epibromohydrine, and α-methylepichlorohydrine. The mono-, di- or poly-oxazolidinone compound may be exemplified by 2-oxazolidinone. The alkylene carbonate compound may include ethylene carbonate. These compounds may be used alone or in combination. To increase the efficiency of the surface crosslinking process, the surface crosslinking agent preferably includes at least one polyhydric alcohol compound, and more preferably includes a polyhydric alcohol compound having 2 to 10 carbon atoms.

The amount of the surface crosslinking agent added to treat the surface of the polymer particles may be properly determined depending on the kind of surface crosslinking agent or the reaction conditions, but is set to 0.001~5 parts by weight, preferably 0.01~3 parts by weight, and more preferably 0.05~2 parts by weight, based on 100 parts by weight of the ground superabsorbent polymer particles.

If the amount of the surface crosslinking agent is too small, a surface crosslinking reaction seldom occurs. In contrast, if the amount thereof exceeds 5 parts by weight based on 100 parts by weight of the polymer, properties of the superabsorbent polymer may deteriorate due to an excessive surface crosslinking reaction.

As such, adding the surface crosslinking agent to the polymer is not limited. The surface crosslinking agent and the polymer powder may be placed in a reaction bath and mixed, or spraying the surface crosslinking agent onto the polymer powder or continuously supplying the polymer and the crosslinking agent to a reaction bath such as a mixer that continuously operates may be implemented.

Upon adding the surface crosslinking agent, the surface temperature of the polymer is preferably 60~90° C.

In an embodiment of the present invention, the temperature of the polymer itself may be 20~80° C. upon adding the surface crosslinking agent, so that increasing the temperature to a reaction temperature is carried out within 1~60 min to perform surface crosslinking in the presence of the surface crosslinking agent. To show the temperature of the polymer itself as above, processes after the drying process that is carried out at relatively high temperature are continuously performed, and the process time may be shortened. Alternatively, the polymer may be separately heated when it is difficult to shorten the process time.

In the method of manufacturing the superabsorbent polymer according to the present invention, the surface crosslinking agent added to the polymer may be heated, so that increasing the temperature to a reaction temperature is carried out within 1~60 min to perform surface crosslinking in the presence of the surface crosslinking agent.

Meanwhile, in the method of manufacturing the superabsorbent polymer according to the present invention, when the surface crosslinking reaction is carried out after increasing the temperature to a reaction temperature within 1~60 min so as to be adapted for surface crosslinking, the efficiency of the surface crosslinking process may be improved. Ultimately, the residual monomer content of the final superabsorbent polymer may be minimized, and the superabsorbent polymer having superior properties may be attained. As such, the temperature of the added surface crosslinking agent is adjusted to 5~60° C., and preferably 10~40° C. If the temperature of the surface crosslinking agent is lower than 5° C., an effect of decreasing the heating rate to the surface crosslinking reaction via heating of the surface crosslinking agent may become insignificant. In contrast, if the temperature of the surface crosslinking agent is higher than 60° C., the surface crosslinking agent may not be uniformly dispersed in the polymer. As used herein, the temperature of the surface crosslinking reaction may be defined as a total temperature of both the polymer and the surface crosslinking agent added for the crosslinking reaction.

A heating member for the surface crosslinking reaction is not limited. Specifically, a heat medium may be supplied, or direct heating may be conducted using electricity, but the present invention is not limited thereto. Specific examples of the heat source may include steam, electricity, UV light, and IR light. Additionally, a heated thermal fluid may be used.

In the method of manufacturing the superabsorbent polymer according to the present invention, after heating for the crosslinking reaction, the crosslinking reaction is carried out for 1~60 min, preferably 5~40 min, and more preferably 10~20 min. If the crosslinking reaction time is shorter than 1 min, the crosslinking reaction may not sufficiently occur. In contrast, if the crosslinking reaction time is longer than 60 min, properties of the superabsorbent polymer may deteriorate due to the excessive surface crosslinking reaction, and the polymer may be subjected to attrition due to long-term residence in the reactor.

The attrition-resistant superabsorbent polymer thus obtained may have a moisture content of 0.1 wt % or more.

In addition, the present invention addresses a method of manufacturing the attrition-resistant superabsorbent polymer comprises: a) adding a superabsorbent polymer (A) with 0.0001~15 parts by weight of particles (B) having i) a BET specific surface area of 300~1500 m$^2$/g and ii) a porosity of 50% or more, based on 100 parts by weight of the superabsorbent polymer (A); and b) adding the superabsorbent polymer (A) and the particles (B) obtained in a) with 0.1~20.0 parts by weight of water (C), based on 100 parts by weight of the superabsorbent polymer (A) and the particles (B), thus preparing a hydrous superabsorbent polymer.

In the method of manufacturing the attrition-resistant superabsorbent polymer, the particles (B) having the properties of i) and ii) are preferably added in an amount of 0.0001~15 parts by weight, more preferably 0.001~2.0 parts by weight, and still more preferably 0.05~0.15 parts by weight, based on 100 parts by weight of the superabsorbent polymer (A). If the amount of the particles (B) is less than the lower limit, desired effects fail to be obtained. In contrast, if the amount thereof exceeds the upper limit, economic benefits may be negated due to the excessive use of the particles (B).

Typically, a superabsorbent polymer has a hydrophilic surface, and thus irreversible agglomeration thereof may occur due to capillary force, hydrogen bonding, inter-particular diffusion, or inter-particular van der Waals force, by water present between the particles upon drying after water absorption. Hence, water is essentially used in the course of polymerization and surface crosslinking of the superabsorbent polymer, and thereby agglomeration is generated, thus increasing internal loads, ultimately incurring damage to the system. Furthermore, since the agglomerated superabsorbent polymer has a large particle size unsuitable for use in applications, a disintegration process has to be implemented so that such a large particle size is decreased properly. Also, strong force is applied in the disintegration process, undesirably deteriorating the properties of the superabsorbent polymer attributed to attrition.

In order to solve such problems, attempts are made to introduce a variety of microparticles that are present on the surface of the superabsorbent polymer and function to prevent direction agglomeration of the polymer particles. In the case where the microparticles are added in an excessive amount, agglomeration may be prevented, but absorption under pressure of the superabsorbent polymer may decrease.

To solve such problems, the microparticles used for the method of manufacturing the attrition-resistant superabsorbent polymer according to the present invention have a particle size ranging from 2 nm to 50 µm. Also, the microparticles have a BET specific surface area of 300~1500 m$^2$/g, preferably 500~1500 m$^2$/g, and more preferably 600~1500 m$^2$/g. The microparticles have superhydrophobicity with a water contact angle of 125° or more, preferably 135° or more, and more preferably 140° or more. Furthermore, the particles (B) may have a particle size ranging from 2 nm to 50 µm and superhydrophobicity with a water contact angle of 125° or more.

The microparticles have a porosity of 50% or more, and preferably 90% or more. Since the microparticles (B) having the properties as above are used in the method of manufacturing the attrition-resistant superabsorbent polymer according to the present invention, the effect of water present on the surface of the polymer may decrease, and also, the use of porous superhydrophobic microparticles may remarkably reduce the agglomeration. Even when a relatively small amount of microparticles is used, permeability may be easily increased, and absorption under pressure may be readily maintained.

In the method of manufacturing the superabsorbent polymer according to the present invention, the particles (B) may include any component without limitation so long as it has the above properties, and examples thereof may include, but are not limited to, inorganic oxides, such as silica ($SiO_2$), alumina, titania ($TiO_2$), carbon, inorganic compounds, organic polymers, ion exchange resins, metals, metal salts, etc.

Also, adding the microparticles may include, but is not limited to, dispersing microparticles in a monomer solution, adding microparticles to a hydrous gel polymer and then dry mixing them with primarily dried polymer particles, dispersing microparticles in water or an organic solvent having a dissolved surface crosslinking agent upon surface crosslinking, dry mixing microparticles separately from water or an organic solvent having a dissolved surface crosslinking agent upon surface crosslinking, or dry mixing microparticles with a surface crosslinked product.

In the method of manufacturing the attrition-resistant superabsorbent polymer, the water (C) is added in an amount of 0.1~20.0 parts by weight, preferably 1.0~10.0 parts by weight, and more preferably 2.5~7.5 parts by weight, based on 100 parts by weight of the superabsorbent polymer (A) and the particles (B). If the amount of the water (C) is less than the lower limit, sufficient attrition resistance cannot be obtained. In contrast, if the amount thereof exceeds the upper limit, surface stickiness of the polymer may increase, and irreversible agglomeration between the superabsorbent polymer particles may occur, undesirably deteriorating processability of the polymer and changing the particle size thereof, making it difficult to serve as a final product.

In the process of manufacturing the superabsorbent polymer, water that is a polymerization medium is variously used in a manner that facilitates the dispersion of the crosslinking solution during the surface crosslinking. Also, residual moisture of the final product functions as an anti-static agent and a plasticizer for resin, and plays a role in suppressing the formation of very small superabsorbent polymer dust in the course of applications and also preventing the attrition of the superabsorbent polymer particles. Generally, however, when water is added even in a small amount to the superabsorbent polymer, surface stickiness of the polymer may be increased by the water absorbed to the surface thereof, and irreversible agglomeration between the superabsorbent polymer particles may occur. The increase in stickiness and the agglomeration as above may result in poor processability, including high loads on the manufacturing and application processes, consequently increasing the particle size of the superabsorbent polymer, and deteriorating the properties and the productivity. Such superabsorbent polymers have been studied to date in terms of the polymerization process and improvement in absorption capacity thereby, and surface crosslinking for increasing the surface properties of the superabsorbent polymer or the absorption under pressure thereof. Furthermore, research is ongoing into changes in the surface properties of the superabsorbent polymer to increase permeability or to prevent caking upon storage (anti-caking).

In the present invention, water is added in the above amount range to the superabsorbent polymer to thereby increase moisture content, so that water functions as a plasticizer, ultimately minimizing physical damage to the superabsorbent polymer to satisfy both high moisture content and high processability. When water is added to the superabsorbent polymer, it may be uniformly contained therein without caking. Accordingly, when the superabsorbent polymer is applied to final products such as diapers, deterioration of the properties of the superabsorbent polymer due to physical attrition by compression or strong air movement during production of the diapers may be minimized.

In the method of manufacturing the attrition-resistant superabsorbent polymer, the superabsorbent polymer (A) is obtained by a) preparing a hydrous gel polymer from a monomer composition comprising a water-soluble ethylenic unsaturated monomer and a polymerization initiator by thermal polymerization or photopolymerization; b) drying the hydrous gel polymer; c) grinding the dried hydrous gel polymer, giving superabsorbent polymer particles; and d) adding the superabsorbent polymer particles with a surface crosslinking agent so that a surface crosslinking reaction is carried out.

The water-soluble ethylenic unsaturated monomer may include any one or more selected from the group consisting of an anionic monomer and salts thereof, a nonionic hydrophilic monomer, and an amino group-containing unsaturated monomer and quaternary salts thereof. The polymerization initiator for thermal polymerization may include any one or more selected from the group consisting of a persulfate-based initiator, an azo-based initiator, hydrogen peroxide, and ascorbic acid, and the polymerization initiator for photopolymerization may include any one or more selected from the group consisting of benzoin ether, dialkyl acetophenone, hydroxyl alkylketone, phenyl glyoxylate, benzyl dimethyl ketal, acyl phosphine, and α-aminoketone.

The drying process in b) is performed at 150~250° C., and the superabsorbent polymer particles obtained after the grinding process in c) may have a particle size of 150~850 μm.

The surface crosslinking agent may include any one or more selected from the group consisting of a polyhydric alcohol compound; an epoxy compound; a polyamine compound; a haloepoxy compound; a haloepoxy compound condensed product; an oxazoline compound; a mono-, di- or poly-oxazolidinone compound; a cyclic urea compound; a polyhydric metal salt; and an alkylene carbonate compound.

Also, in an embodiment of the present invention, c) grinding the hydrous superabsorbent polymer to check attrition resistance thereof may be further performed, after preparing the hydrous superabsorbent polymer in b).

A grinder used to grind the hydrous superabsorbent polymer in c) may include at least one selected from the group consisting of a ball mill, a pin mill, a hammer mill, a screw mill, a roll mill, a disc mill, and a jog mill.

Checking the attrition resistance of the hydrous superabsorbent polymer in c) may be performed by measuring changes in particle size of the superabsorbent polymer (A) after the grinding process depending on the amount of the microparticles (B) or water (C) added thereto, or changes in centrifugal retention capacity, absorption under pressure and permeability thereof. Specifically, changes in particle size after the grinding process may be checked by sorting the attrition-resistant superabsorbent polymer into particles having a particle size of 20 mesh, particles having a particle size of less than 30 mesh but exceeding 20 mesh, particles having a particle size from 30 mesh to less than 50 mesh, particles having a particle size from 50 mesh to less than 100 mesh, and particles having a particle size of 100 mesh and then determining the particle size distribution after the grinding process depending on the amount of the microparticles (B) or water (C) added thereto.

In another embodiment of the present invention, the method may further include, after preparing the hydrous superabsorbent polymer in b), c2) sorting the hydrous superabsorbent polymer into particles having a particle size of less than 30 mesh, particles having a particle size from 30 mesh to less than 50 mesh, and particles having a particle size of 50 mesh or more; d) grinding the superabsorbent polymer particles sorted in c2); and e) re-sorting the superabsorbent polymer particles ground in d) into particles having a particle size of less than 30 mesh, particles having a particle size from 30 mesh to less than 50 mesh, and particles having a particle size of 50 mesh or more, and then measuring a change in the particles having a particle size from 30 mesh to less than 50 mesh, thus evaluating the particle size distribution.

Also, the method may further include, after e) evaluating the particle size distribution, f) measuring a change in absorption under pressure (AUP) or permeability of the ground attrition-resistant superabsorbent polymer particles, thus evaluating changes in the properties of the superabsorbent polymer after attrition of the particles.

In addition thereto, a detailed description of the superabsorbent polymer (A), the particles (B), and the water (C) in the method of manufacturing the attrition-resistant superabsorbent polymer according to the present invention quotes the description of the attrition-resistant superabsorbent polymer herein.

A better understanding of the present invention may be obtained via the following examples that are set forth to illustrate, but are not to be construed as limiting the scope of the present invention. The scope of the present invention is shown in the claims, and also contains all modifications within the meaning and range equivalent to the claims. Unless otherwise mentioned, "%" and "part" showing the amount in the following examples and comparative examples refers to a mass basis.

Preparation of Hydrous Gel Polymer and Superabsorbent Polymer 100 g of acrylic acid, 0.3 g of polyethyleneglycol diacrylate as a crosslinking agent, 0.033 g of diphenyl(2,4,6-trimethylbenzoyl)-phosphine oxide as an initiator, 38.9 g of sodium hydroxide (NaOH), and 103.9 g of water were mixed, thus preparing a monomer mixture. The monomer mixture was then placed on a continuously moving conveyor belt, and irradiated with UV light (at 2 mW/cm$^2$) so that UV polymerization was carried out for 2 min, giving a hydrous gel polymer. The hydrous gel polymer thus prepared was cut to a size of 5×5 min, dried in a hot air oven at 170° C. for 2 hr, and ground using a pin mill, and then sorted using a sieve, thereby obtaining a superabsorbent polymer having a particle size of 150~850 μm.

As porous superhydrophobic microparticles, an aerogel (available from JIOS) was used, and had an average particle size of 5 μm, a BET specific surface area of 720 m$^2$/g, a water contact angle of 144°, and a porosity of 95%. In Preparation Example 1, the porous superhydrophobic microparticles in an amount of 600 ppm based on the amount of the superabsorbent polymer were placed in a stirrer, and during stirring, water was added in amounts of 0 (P/D), 2.5, 5.0, and 7.5 wt %, based on the amount of the superabsorbent polymer. In Preparation Example 2, the porous superhydrophobic microparticles in amounts of 600 ppm and 1000 ppm based on the amount of the superabsorbent polymer were placed in a stirrer, and during stirring, water was added in amounts of 0, 2.5, and 5.0 wt % based on the amount of the superabsorbent polymer.

Preparation Example 1: Formation of Attrition-Resistant Superabsorbent Polymer 1

In order to evaluate the extent of deteriorating the properties of a superabsorbent polymer by simulation when finally applied to a product, attrition resistance testing via ball milling was implemented. To measure the effect of water on attrition resistance, the superabsorbent polymer was treated with 600 ppm of porous superhydrophobic microparticles and then added with water in amounts of 2.5, 5.0, and 7.5 wt % as below. As the porous superhydrophobic microparticles, an Aerogel (JIOS) was used, and had an average particle size of 5 μm, a BET specific surface area of 720 m$^2$/g, a water contact angle of 144°, and a porosity of 95%. The particle size of the Aerogel was measured through Laser Diffraction using HELOS (Helium-Neon Laser Optical System) based on ISO 13320. The specific surface area thereof was measured using a BET meter (Micromeritics 3Flex). The porosity thereof was determined from the tap density ($\rho_t$) and the true density ($\rho_s$) of Equation 1 below.

$$\text{Porosity (\%)}=(1-\rho_t/\rho_s)*100 \qquad \text{[Equation 1]}$$

In order to measure the true density, a pycnometer (Accupyc II 1340) was used, and the tap density was measured using a volumeter (Engelsmann Model STAV II).

The water contact angle was measured using a contact angle analyzer (KRUSS DSA100), and was specifically determined in a manner in which double-sided tape was attached to a flat glass plate, microparticles were applied in a monolayer thereon, and then 5 μL of ultrapure water was placed in the form of drop on the monolayer, and the angle between the water drop and the glass plate was measured four times and averaged.

Testing for increasing the moisture content of the superabsorbent polymer was conducted in a lab, and 250 g of the superabsorbent polymer was used. 20 g of the hydrous superabsorbent polymer having a particle size of #30~#50 was placed in a jar having an inner diameter of 10 cm and the total capacity of 1 L with ten alumina balls having a diameter of 2.5 cm, followed by ball milling for 20 min at 300 rpm. Then, measuring a change in the particle size distribution having a particle size from 30 mesh to less than 50 mesh.

Table 1 below shows the results of moisture content of individual samples depending on the amount of water.

TABLE 1

| Sample | P/D | 2.5% | 5.0% | 7.5% |
|---|---|---|---|---|
| Moisture content (%) | 0.43 | 3.03 | 4.35 | 6.25 |

For the samples having high moisture content, changes in particle size were measured before and after ball milling. The results are graphed in FIG. 1. The anhydrous P/D had a particle size in which the proportion of #20~#30 was significantly decreased after ball milling. This is considered to be because the particle size is decreased due to attrition of the superabsorbent polymer. Upon addition of 2.5% of water, there were no significant changes in particle size over the total particle size range. On the other hand, when the amount of water added to the superabsorbent polymer was 5.0%, the proportion of #20~#30 was remarkably decreased as in P/D. However, based on increments in the particle size after ball milling compared to P/D, the particle size was considered to be decreased because the agglomerated portion of the superabsorbent polymer generated by water addition was separated.

Test Examples: Evaluation of Properties

The properties of the attrition-resistant superabsorbent polymer samples of Preparation Example 1 were evaluated through the following.

Test Example 1: Centrifugal Retention Capacity (CRC)

CRC of the superabsorbent polymer samples of Preparation Example 1 was measured. CRC was measured using the EDANA 241.3 (10) (IST 241.2(02)) of European Disposables and Nonwovens Association standard. Specifically, CRC was measured by uniformly placing W (g) (about 0.1 g) of each superabsorbent polymer sample of Preparation Example 1 in a nonwoven fabric envelope, sealing the envelope, and then immersing it in a 0.9 mass % saline at room temperature. After 30 min, the envelope was dewatered at 250 G for 3 min using a centrifuge, after which the mass W2 (g) of the envelope was measured. Also, the same procedures were performed without the use of the polymer, and the mass W1 (g) was measured. Then, CRC (g/g) was calculated from the measured mass values by the following Equation 1.

$$\text{CRC(g/g)}=\{(W2(g)-W1(g))/W(g)\}-1 \qquad \text{[Equation 1]}$$

Test Example 2: Absorption Under Pressure (AUP)

AUP of the superabsorbent polymer samples of Preparation Example 1 was measured. AUP was measured using the EDANA 242.3 (11) (IST 242.2(02)) of European Disposables and Nonwovens Association standard. Specifically, AUP was measured in such a manner that a 400 mesh stainless steel wire mesh was mounted to the bottom of a plastic cylinder having an inner diameter of 60 min, 0.90 g of each superabsorbent polymer sample of Preparation Example 1 was uniformly sprayed onto the wire mesh at room temperature under a humidity of 50%, and a load of 4.83 kPa (0.7 psi) was uniformly applied thereon using a piston having an outer diameter slightly smaller than 60 min without any gap from the inner wall of the cylinder and also with efficient up and down motion. As such, the weight Wa (g) of the above measuring device was measured.

A glass filter having a diameter of 90 mm and a thickness of 5 mm was placed inside a petro dish having a diameter of 150 mm, and a saline composed of 0.90 wt % sodium chloride was added so as to be flush with the upper surface of the glass filter. Then, a filter paper having a diameter of 90 mm was placed thereon. The measuring device was placed on the filter paper so as to absorb the liquid under loads for 1 hr. After 1 hr, the measuring device was removed, and the weight Wb (g) thereof was measured.

AUP was calculated from Wa and Wb by the following Equation 2.

$$\text{AUP(g/g)}=[Wb(g)-Wa(g)]/\text{absorbent polymer mass (g)} \qquad \text{[Equation 2]}$$

Test Example 3: Saline Flow Conductivity (SFC)

The SFC value of the present invention was determined by measuring the permeability of each superabsorbent polymer sample of Preparation Example 1 with a 0.69 wt % sodium chloride aqueous solution at a load of 2.07 kPa according to the SFC testing method disclosed in U.S. Pat. No. 5,669,894.

Table 2 below shows changes in properties and variations of individual superabsorbent polymer samples of Preparation Example 1 before and after ball milling depending on an increase in the amount of added water.

TABLE 2

|  | CRC (g/g) | | | AUP (g/g) | | | SFC (cm³ · s/g) | | |
| --- | --- | --- | --- | --- | --- | --- | --- | --- | --- |
|  | Before | After | Variation (%) | Before | After | Variation (%) | Before | After | Variation (%) |
| P/D | 35.1 | 36.4 | 3.7 | 23.7 | 19.4 | −18.1 | 6.4 | 2.4 | −62.5 |
| 2.5% | 33.2 | 34.0 | 2.4 | 22.1 | 20.0 | −9.5 | 8.2 | 4.5 | −45.1 |
| 5.0% | 33.2 | 33.1 | −0.3 | 21.5 | 18.9 | −12.1 | 7.1 | 5.5 | −22.5 |

Preparation Example 2: Formation of Attrition-Resistant Superabsorbent Polymer 2

Based on the results of Preparation Example 1, pilot testing was performed. 25 kg of the superabsorbent polymer per batch was used, and the superabsorbent polymer was treated with porous superhydrophobic microparticles and then added with water as shown in the following table, to evaluate attrition resistance. The superabsorbent polymer itself was P/D (Comparative Example 1), the sample where the superabsorbent polymer was not treated and merely stirred was #1 (Comparative Example 2), the samples that were treated with porous superhydrophobic microparticles (Aerogel) and not added with water were #2 (Comparative Example 3) and #4 (Comparative Example 4), and the samples that were treated with porous superhydrophobic microparticles (Aerogel) and sorted depending on the amount of water were #3 (Example 1), #5 (Example 2), and #6 (Example 3).

Table 3 below shows the results of moisture content of individual samples depending on the amounts of porous superhydrophobic microparticles and water.

TABLE 3

| Label | Water | Aerogel (ppm) | Moisture content (%) |
| --- | --- | --- | --- |
| #1 | 0% | 0 | 0.32 |
| #2 | 0% | 600 | 0.29 |
| #3 | 2.5% | 600 | 2.55 |
| #4 | 0% | 1,000 | 0.29 |
| #5 | 2.5% | 1,000 | 2.56 |
| #6 | 5.0% | 1,000 | 4.64 |

Figure 2:
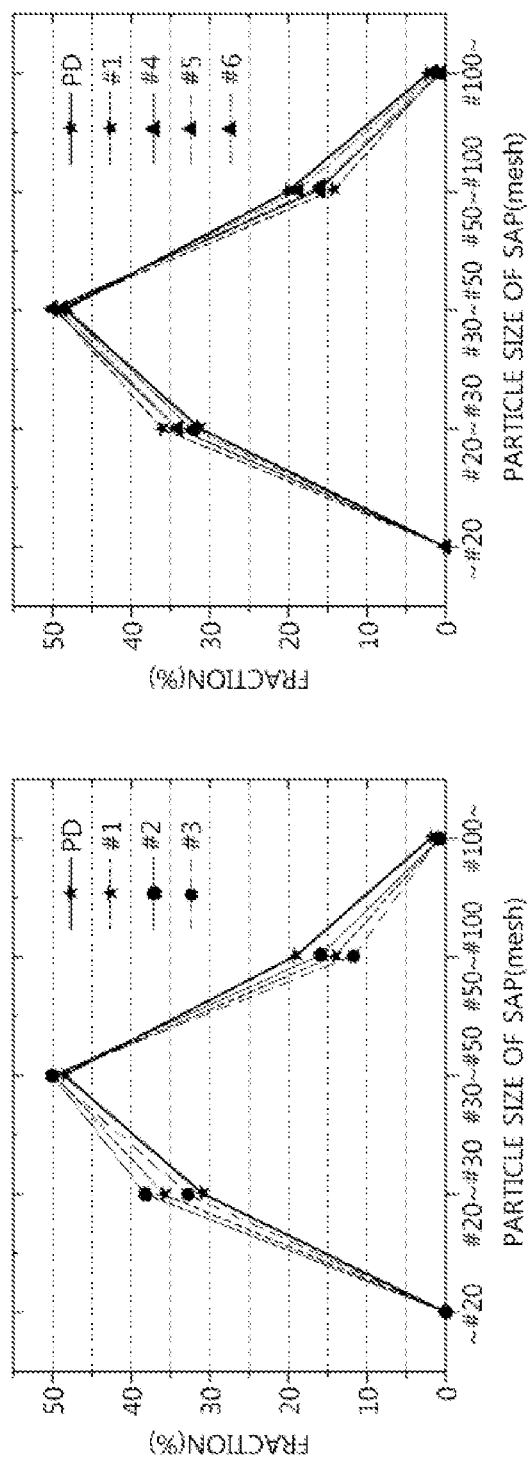
FIG. 2 is of graphs illustrating the particle size distribution of individual samples to evaluate changes in the particle size of a superabsorbent polymer according to the present invention through treatment with porous superhydrophobic microparticles and then addition of water.

The individual samples as above were measured for particle size distribution. The results are graphed in FIG. 2.

Preparation Example 3: Formation of Attrition-Resistant Superabsorbent Polymer 3

Figure 3:
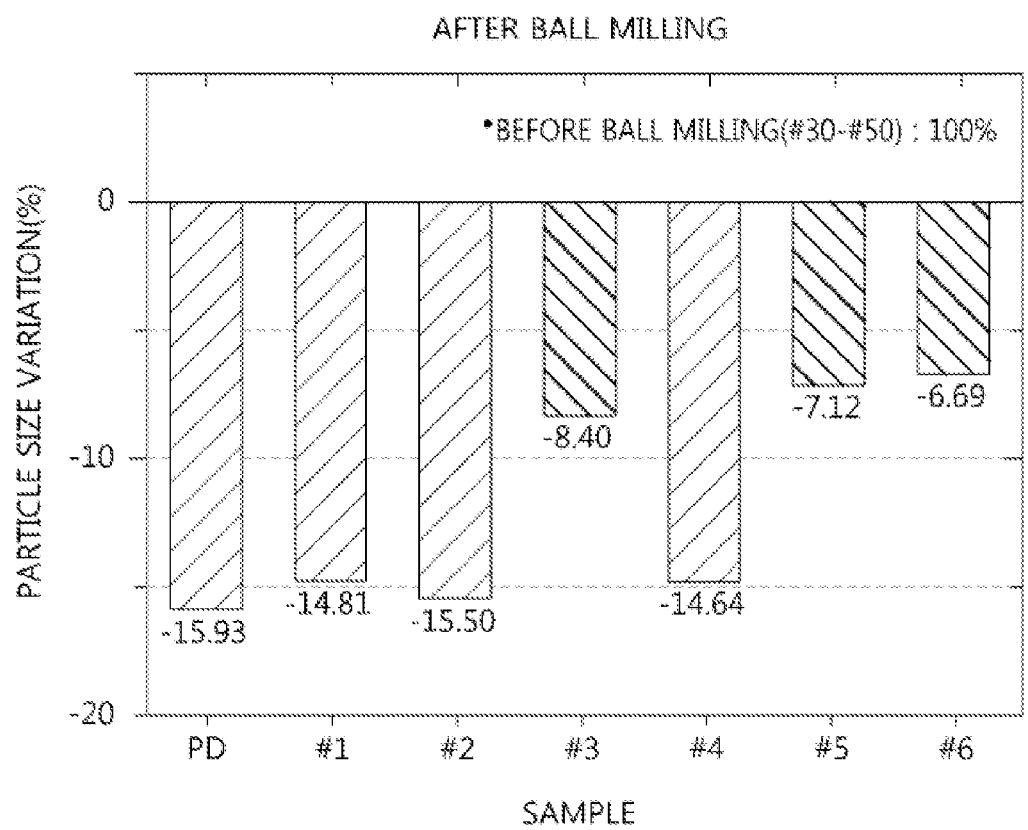
FIG. 3 is a graph illustrating a reduction in the amount of the superabsorbent polymer having a particle size of #30~#50 in individual samples by re-sorting the superabsorbent polymer subjected to attrition by ball milling using #30 and #50 sieves, to evaluate changes in the particle size of the attrition-resistant superabsorbent polymer according to the present invention after ball milling.

To more reliably observe changes in particle size after ball milling, the individual samples of Preparation Example 2 were sorted using #30 and #50 sieves. Thereafter, ball milling was performed in the same manner as in Preparation Example 1. The superabsorbent polymer subjected to attrition by ball milling was re-sorted using #30 and #50 sieves, and thereby a reduction in the amount of the superabsorbent polymer having a particle size of #30~#50 was checked. The results are graphed in FIG. 3. As illustrated in FIG. 3, in the sample (PD) where the superabsorbent polymer was not treated, the superabsorbent polymer having a particle size of #30~#50 remained in an amount of 84.07% after ball milling. This means that about 16% of the superabsorbent polymer was subjected to attrition. The sample #1 (Comparative Example 2) where only stirring was performed had similar results. The samples #3 and #5 where the superabsorbent polymer was treated with 600 ppm and 1,000 ppm of porous superhydrophobic microparticles were similarly subjected to attrition. However, in the samples #3, #5 and #6 where the superabsorbent polymer was added with water, the extent of attrition of the particles was obviously reduced. Thus, water added to the superabsorbent polymer can be confirmed to function as a plasticizer to effectively suppress attrition of the particles.

Test Example 4: Centrifugal Retention Capacity (CRC)

Figure 4:
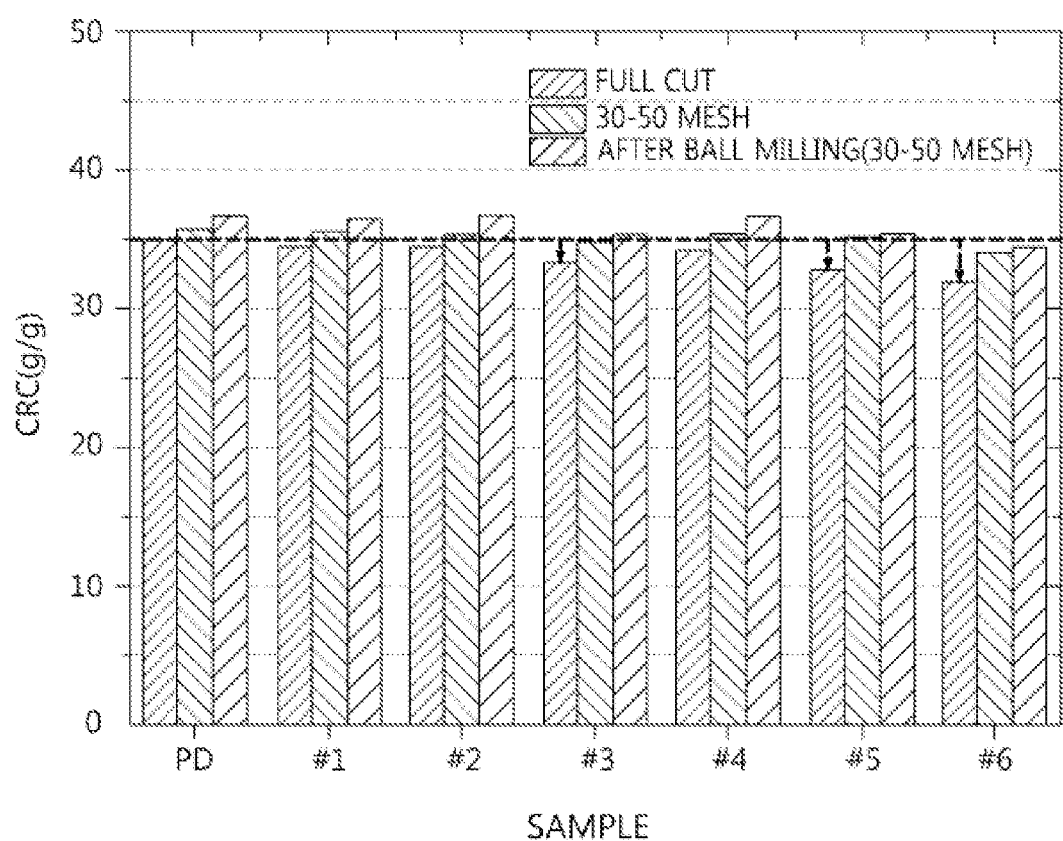
FIG. 4 is a graph illustrating changes in centrifugal retention capacity of individual samples for the attrition-resistant superabsorbent polymer according to the present invention before/after ball milling.

To evaluate changes in CRC of the superabsorbent polymer before and after ball milling, the individual samples of Preparation Example 2 were sorted using #30 and #50 sieves. Then, ball milling was performed as in Preparation Example 1. The superabsorbent polymer samples subjected to attrition by ball milling were re-sorted using #30 and #50 sieves, and changes in CRC in the range of #30~#50 were measured. The results are graphed in FIG. 4. CRC was measured as in Test Example 1. Referring to FIG. 4, CRC was lowered corresponding to the amount of added water in the samples #3, #5 and #6. As can be seen indirectly from this, the increment in CRC before and after ball milling was small compared to when water was not added, and thus changes in CRC due to attrition of the particles were relatively low.

Test Example 5: Evaluation of Changes in AUP

Figure 5A:
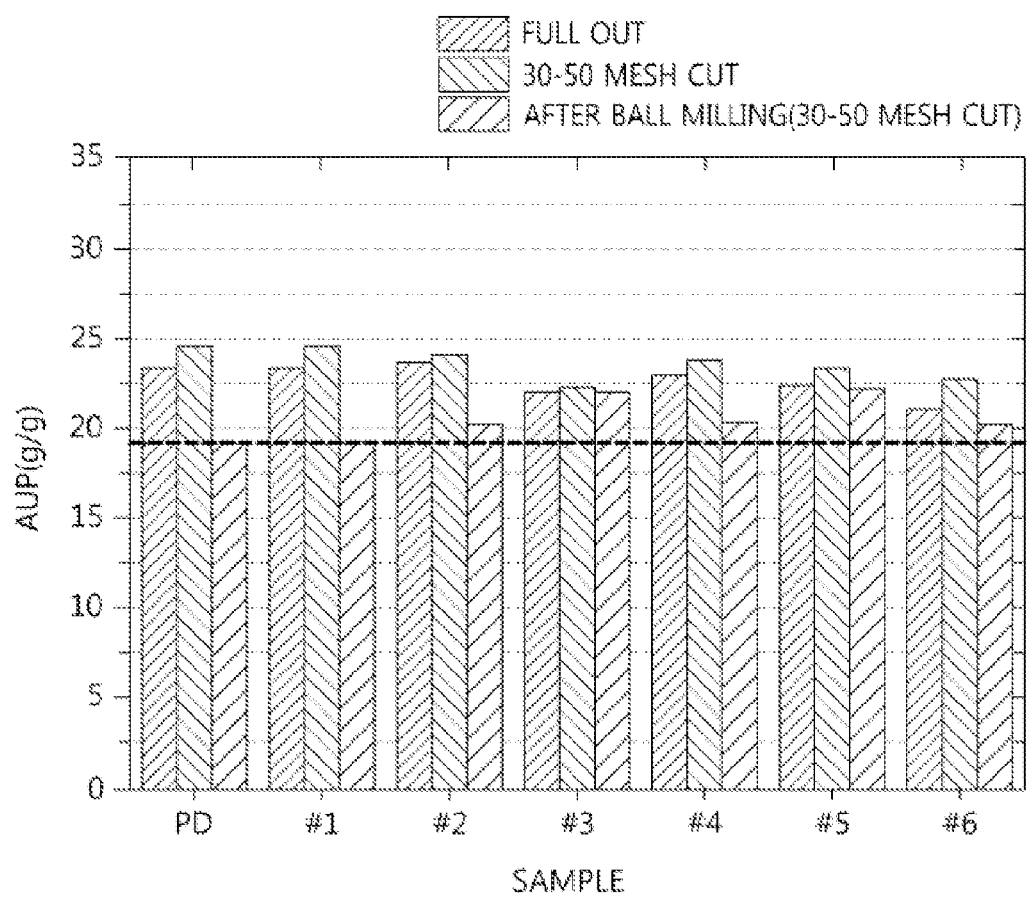
FIG. 5A is a graph illustrating changes in absorption under pressure of individual samples for the attrition-resistant superabsorbent polymer according to the present invention before/after ball milling.

The attrition-resistant superabsorbent polymer samples of Preparation Example 3 were measured for AUP in the same manner as in Test Example 2 to evaluate changes in the properties. The results are shown in FIG. 5A. Compared to the superabsorbent polymer sample without any treatment, the samples added with water were increased in AUP after ball milling. In the samples #2 and #3, when water was added despite the use of the same amount of porous superhydrophobic microparticles, AUP reduction after ball milling was curbed.

Test Example 6: Evaluation of Changes in Permeability

Figure 5B:
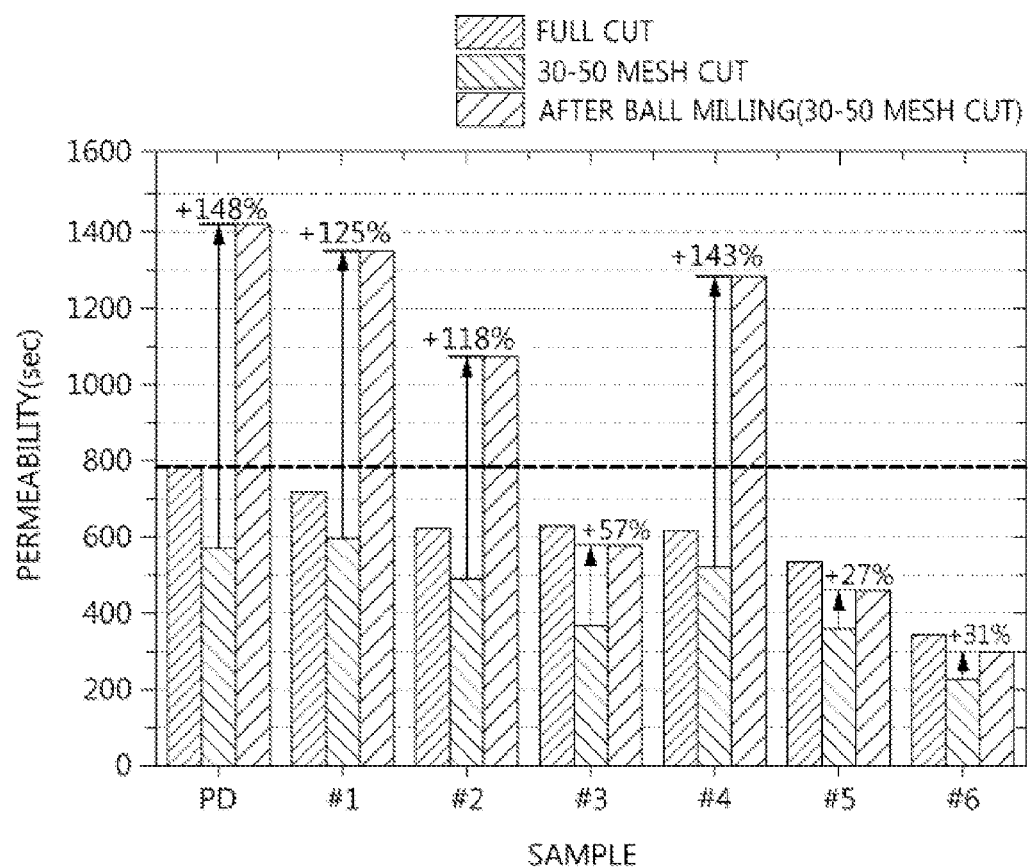
FIG. 5B is a graph illustrating changes in permeability of individual samples for the attrition-resistant superabsorbent polymer according to the present invention before/after ball milling.

The attrition-resistant superabsorbent polymer samples of Preparation Example 3 were measured for permeability to evaluate changes in the properties. The results are shown in FIG. 5B. Permeability was closely related with attrition of the particles, which can be seen in the graph of FIG. 5B. As for the superabsorbent polymer alone or the superabsorbent polymer added with only the porous superhydrophobic microparticles, permeability was decreased to 100% or more after ball milling. Whereas, in the superabsorbent polymer added with water, permeability was decreased to the level of half or less thereof. Consequently, the superabsorbent polymer added with water shows that deterioration of the properties thereof is curbed even under external pressure and impact, and high resistance to physical attrition is exhibited. Therefore, in the attrition-resistant superabsorbent polymer according to the present invention, even when the superabsorbent polymer is added with water, surface stickiness thereof is not increased and the particle size is maintained, thus preventing processability from decreasing, thereby enabling easy control of the process load, particle size, and properties in the manufacturing process.

What is claimed is:

1. An attrition-resistant hydrous superabsorbent polymer, comprising:
   a superabsorbent polymer (A), particles (B) having i) a BET specific surface area of 300-1500 $m^2/g$ and ii) a porosity of 50% or more, and water (C),
   wherein the particles (B) are contained in an amount of 0.0001-15 parts by weight based on 100 parts by weight of the superabsorbent polymer (A), and the water (C) is contained in an amount of 0.1-20.0 parts by weight based on 100 parts by weight of the superabsorbent polymer (A) and the particles (B).

2. The attrition-resistant hydrous superabsorbent polymer of claim 1, wherein the particles (B) are contained in an amount of 0.001-2.0 parts by weight based on 100 parts by weight of the superabsorbent polymer (A).

3. The attrition-resistant hydrous superabsorbent polymer of claim 1, wherein the particles (B) are contained in an amount of 0.05-0.15 parts by weight based on 100 parts by weight of the superabsorbent polymer (A).

4. The attrition-resistant hydrous superabsorbent polymer of claim 1, wherein the water (C) is contained in an amount of 1.0-10.0 parts by weight based on 100 parts by weight of the superabsorbent polymer (A) and the particles (B).

5. The attrition-resistant hydrous superabsorbent polymer of claim 1, wherein the water (C) is contained in an amount of 2.5-7.5 parts by weight based on 100 parts by weight of the superabsorbent polymer (A) and the particles (B).

6. The attrition-resistant hydrous superabsorbent polymer of claim 1, wherein the particles (B) have a particle size ranging from 2 nm to 50 μm.

7. The attrition-resistant hydrous superabsorbent polymer of claim 1, wherein the particles (B) have superhydrophobicity with a water contact angle of 125° or more.

8. The attrition-resistant hydrous superabsorbent polymer of claim 1, wherein the particles (B) have a particle size ranging from 2 nm to 50 μm and superhydrophobicity with a water contact angle of 125° or more.

9. The attrition-resistant hydrous superabsorbent polymer of claim 1, wherein the particles (B) have a BET specific surface area of 500-1500 $m^2/g$.

10. The attrition-resistant hydrous superabsorbent polymer of claim 1, wherein the particles (B) have a BET specific surface area of 600-1500 $m^2/g$.

11. The attrition-resistant hydrous superabsorbent polymer of claim 7, wherein the particles (B) have superhydrophobicity with a water contact angle of 135° or more.

12. The attrition-resistant hydrous superabsorbent polymer of claim 7, wherein the particles (B) have superhydrophobicity with a water contact angle of 140° or more.

13. The attrition-resistant hydrous superabsorbent polymer of claim 1, wherein the particles (B) have a porosity of 90% or more.

14. The attrition-resistant hydrous superabsorbent polymer of claim 1, wherein the particles (B) comprise at least one selected from the group consisting of silica ($SiO_2$), alumina, carbon, and titania ($TiO_2$).

15. The attrition-resistant hydrous superabsorbent polymer of claim 1, wherein the attrition-resistant superabsorbent polymer has a moisture content of 0.1 wt % or more.

16. A method of manufacturing an attrition-resistant hydrous superabsorbent polymer, comprising:
   a) adding a superabsorbent polymer (A) with 0.0001-15 parts by weight of particles (B) having i) a BET specific surface area of 300-1500 $m^2/g$ and ii) a porosity of 50% or more, based on 100 parts by weight of the superabsorbent polymer (A); and
   b) adding the superabsorbent polymer (A) and the particles (B) obtained in a) with 0.1-20.0 parts by weight of water (C), based on 100 parts by weight of the superabsorbent polymer (A) and the particles (B), thus preparing a hydrous superabsorbent polymer.

17. The method of claim 16, further comprising c) grinding the hydrous superabsorbent polymer to check attrition resistance thereof, after preparing the hydrous superabsorbent polymer in b).

18. The method of claim 16, wherein the particles (B) are added in an amount of 0.001-2.0 parts by weight based on 100 parts by weight of the superabsorbent polymer (A).

19. The method of claim 16, wherein the particles (B) are added in an amount of 0.05-0.15 parts by weight, based on 100 parts by weight of the superabsorbent polymer (A).

20. The method of claim 16, wherein the water (C) is added in an amount of 1.0-10.0 parts by weight, based on 100 parts by weight of the superabsorbent polymer (A) and the particles (B).

21. The method of claim 16, wherein the water (C) is added in an amount of 2.5-7.5 parts by weight, based on 100 parts by weight of the superabsorbent polymer (A) and the particles (B).

22. The method of claim 16, wherein the particles (B) have a particle size ranging from 2 nm to 50 μm.

23. The method of claim 16, wherein the particles (B) have superhydrophobicity with a water contact angle of 125° or more.

24. The method of claim 16, wherein the particles (B) have a particle size ranging from 2 nm to 50 μm and superhydrophobicity with a water contact angle of 125° or more.

25. The method of claim 16, wherein the particles (B) have a BET specific surface area of 500-1500 $m^2/g$.

26. The method of claim 16, wherein the particles (B) have a BET specific surface area of 600-1500 $m^2/g$.

27. The method of claim 23, wherein the particles (B) have superhydrophobicity with a water contact angle of 135° or more.

28. The method of claim 23, wherein the particles (B) have superhydrophobicity with a water contact angle of 140° or more.

29. The method of claim 16, wherein the particles (B) have a porosity of 90% or more.

30. The method of claim 16, wherein the particles (B) comprise at least one selected from the group consisting of silica ($SiO_2$), alumina, carbon, and titania ($TiO_2$).

31. The method of claim 16, wherein the superabsorbent polymer (A) is obtained by:
   a) preparing a hydrous gel polymer from a monomer composition comprising a water-soluble ethylenic unsaturated monomer and a polymerization initiator by thermal polymerization or photopolymerization;
   b) drying the hydrous gel polymer;

c) grinding the dried hydrous gel polymer, giving superabsorbent polymer particles; and d) adding the superabsorbent polymer particles with a surface crosslinking agent so that a surface crosslinking reaction is carried out.

32. The method of claim 31, wherein the water-soluble ethylenic unsaturated monomer comprises any one or more selected from the group consisting of an anionic monomer and salts thereof, a nonionic hydrophilic monomer, and an amino group-containing unsaturated monomer and quaternary salts thereof.

33. The method of claim 31, wherein the polymerization initiator for thermal polymerization comprises any one or more selected from the group consisting of a persulfate-based initiator, an azo-based initiator, hydrogen peroxide, and ascorbic acid.

34. The method of claim 31, wherein the polymerization initiator for photopolymerization comprises any one or more selected from the group consisting of benzoin ether, dialkyl acetophenone, hydroxyl alkylketone, phenyl glyoxylate, benzyl dimethyl ketal, acyl phosphine, and α-aminoketone.

35. The method of claim 31, wherein the drying in b) is performed at 150-250° C.

36. The method of claim 31, wherein the superabsorbent polymer particles obtained in c) have a particle size of 150-850 μm.

37. The method of claim 31, wherein the surface crosslinking agent comprises any one or more selected from the group consisting of a polyhydric alcohol compound; an epoxy compound; a polyamine compound; a haloepoxy compound; a haloepoxy compound condensed product; an oxazoline compound; a mono-, di- or poly-oxazolidinone compound; a cyclic urea compound; a polyhydric metal salt; and an alkylene carbonate compound.

* * * * *